United States Patent
Mitchell et al.

(10) Patent No.: US 9,487,413 B2
(45) Date of Patent: Nov. 8, 2016

(54) WATER FILTER ASSEMBLY FOR A BEVERAGE DISPENSER

(71) Applicant: General Electric Company, Schenectady, NY (US)

(72) Inventors: Alan Joseph Mitchell, Louisville, KY (US); Gregory Sergeevich Chernov, Louisville, KY (US); Ansuraj Seenivasan, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 0 days.

(21) Appl. No.: 14/600,294

(22) Filed: Jan. 20, 2015

(65) Prior Publication Data

US 2016/0207790 A1    Jul. 21, 2016

(51) Int. Cl.
| | |
|---|---|
| A47J 31/44 | (2006.01) |
| C02F 1/00 | (2006.01) |
| B01D 35/02 | (2006.01) |
| B01D 35/153 | (2006.01) |
| A47J 31/46 | (2006.01) |

(52) U.S. Cl.
CPC .............. *C02F 1/003* (2013.01); *A47J 31/446* (2013.01); *A47J 31/465* (2013.01); *B01D 35/02* (2013.01); *B01D 35/153* (2013.01)

(58) Field of Classification Search
CPC .... A47J 31/446; A47J 31/465; B01D 35/02; B01D 35/153; C02F 1/003
See application file for complete search history.

(56) References Cited

U.S. PATENT DOCUMENTS

| | | | | |
|---|---|---|---|---|
| 3,853,761 | A * | 12/1974 | McClory | B01D 35/043 210/100 |
| 5,354,464 | A * | 10/1994 | Slovak | B01D 35/303 210/240 |
| 5,961,004 | A * | 10/1999 | DeMars | A47G 19/2288 220/710.5 |
| 6,067,895 | A * | 5/2000 | Buist | A47J 31/4407 99/283 |
| 6,395,190 | B1 | 5/2002 | Koslow et al. | |
| 6,426,001 | B1 | 7/2002 | Fritze | |
| 6,585,887 | B2 * | 7/2003 | Michels | B01D 27/103 137/340 |
| 8,011,032 | B2 * | 9/2011 | Cline | E04H 4/129 4/506 |
| 2005/0035042 | A1 * | 2/2005 | Rowe | B01D 35/153 210/234 |
| 2006/0124532 | A1 * | 6/2006 | Magnusson | B01D 35/153 210/420 |
| 2007/0045170 | A1 * | 3/2007 | Wawrla | A47J 31/605 210/435 |
| 2007/0119772 | A1 * | 5/2007 | Hiranaga | B01D 27/08 210/436 |
| 2008/0282459 | A1 * | 11/2008 | Cline | E04H 4/129 4/493 |
| 2011/0089103 | A1 | 4/2011 | Bommi et al. | |

FOREIGN PATENT DOCUMENTS

| | | |
|---|---|---|
| DE | 202008002581 U1 | 5/2008 |
| EP | 2353690 A1 | 8/2011 |
| WO | 2005/005013 A1 | 1/2005 |

* cited by examiner

*Primary Examiner* — Frederick C Nicolas
*Assistant Examiner* — Bob Zadeh
(74) *Attorney, Agent, or Firm* — Dority & Manning, P.A.

(57) ABSTRACT

A water filter assembly for a beverage dispenser having a reservoir is provided. The water filter assembly includes a filter medium extending along an axial direction and a housing enclosing the filter medium also extending along the axial direction. The housing includes a channel having an inlet proximate to a second end of housing for receipt of unfiltered water from the reservoir and extending to a position proximate a first end of housing. The channel is configured to provide unfiltered water to a location proximate the first end of housing such that an entire surface area of filter medium is utilized in filtering the water in reservoir to minimize a pressure drop across the water filter assembly during operation.

20 Claims, 9 Drawing Sheets

WATER FILTER ASSEMBLY FOR A BEVERAGE DISPENSER

FIELD OF THE INVENTION

The present subject matter relates generally to a water filter assembly for a beverage dispenser.

BACKGROUND OF THE INVENTION

Single serve beverage dispensers (SSBDs) are increasingly popular and have become ubiquitous on kitchen countertops. Certain SSBDs are loaded with capsules or pods that allow users to brew or mix an individual-size, unique, hot or cold beverage. Thus, SSBDs may provide a single cup of coffee to users who do not consume or desire an entire pot of coffee. In order to provide single beverages, SSBDs generally dispense small volumes of liquid (e.g., between eight and sixteen ounces) for each beverage. To permit consecutive preparation of beverages and decrease preparation time, certain SSBDs include a removable storage reservoir. The storage reservoir is generally sized to between four and eight dispenses worth of water therein.

A filter may be provided within the reservoir over an outlet of the reservoir to filter contaminants from the water within the reservoir. In order to minimize a pressure drop over the filter (which may cause difficulties for certain is SSBDs), the filters are generally configured as a single mesh filter. However, such a filter may be ineffective at filtering particles from the water within the reservoir smaller than a certain threshold. Additionally, such a filter may be ineffective at filtering volatile organic compounds—such as chloroform, lindane, and atrazine—from the water within the reservoir.

Accordingly, a water filter assembly for a beverage dispenser capable of more effectively removing particles and/or volatile organic compounds from the water within the reservoir would be beneficial. Moreover, a water filter assembly for a beverage dispenser capable of more effectively removing particles and/or volatile organic compounds from water within a reservoir while minimizing a pressure drop over such filter would be particularly useful.

BRIEF DESCRIPTION OF THE INVENTION

Aspects and advantages of the invention will be set forth in part in the following description, or may be apparent from the description, or may be learned through practice of the invention.

In a first exemplary embodiment, a water filter assembly is provided for a beverage dispenser having a reservoir. The water filter assembly defines an axial direction and a radial direction and includes a filter medium extending along the axial direction and defining an interior filtered water chamber. The water filter assembly additionally includes a housing extending along the axial direction between a first end and a second end and enclosing the filter medium. The housing and the filter medium define an unfiltered water chamber between the housing and the filter medium. The housing additionally defines a channel having an inlet proximate to the second end for receipt of unfiltered water from the reservoir. The channel extends from the second end proximate to the first end to provide unfiltered water to the unfiltered water chamber at a location proximate the first end of the housing. The housing further defines an outlet in flow communication with the interior filtered water chamber of the filter medium for providing filtered water to an outlet of the reservoir.

In a second exemplary embodiment, a beverage dispenser is provided including a dispenser, a hot water chamber for providing the dispenser with heated water, and a reservoir. The reservoir defines an outlet and includes a fitting attached to the reservoir. The fitting at least partially surrounds the outlet, the outlet of the reservoir fluidly connected to the hot water chamber for providing water to the hot water chamber. The beverage dispenser additionally includes a water filter assembly positioned in the reservoir and attached to the fitting of the reservoir. The water filter assembly defines an axial direction and a radial direction and includes a filter medium extending along the axial direction and defining an interior filtered water chamber. The water filter assembly also including a housing. The housing extends along the axial direction between a first end and a second end and encloses the filter medium. The housing and the filter medium define an unfiltered water chamber between the housing and the filter medium. The housing additionally defines a channel having an inlet proximate to the second end for receipt of unfiltered water from the reservoir. The channel extends from the second end proximate to the first end to provide unfiltered water to the unfiltered water chamber at a location proximate the first end of the housing. The housing further defines an outlet in flow communication with the interior filtered water chamber of the filter medium for providing filtered water to the outlet of the reservoir.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
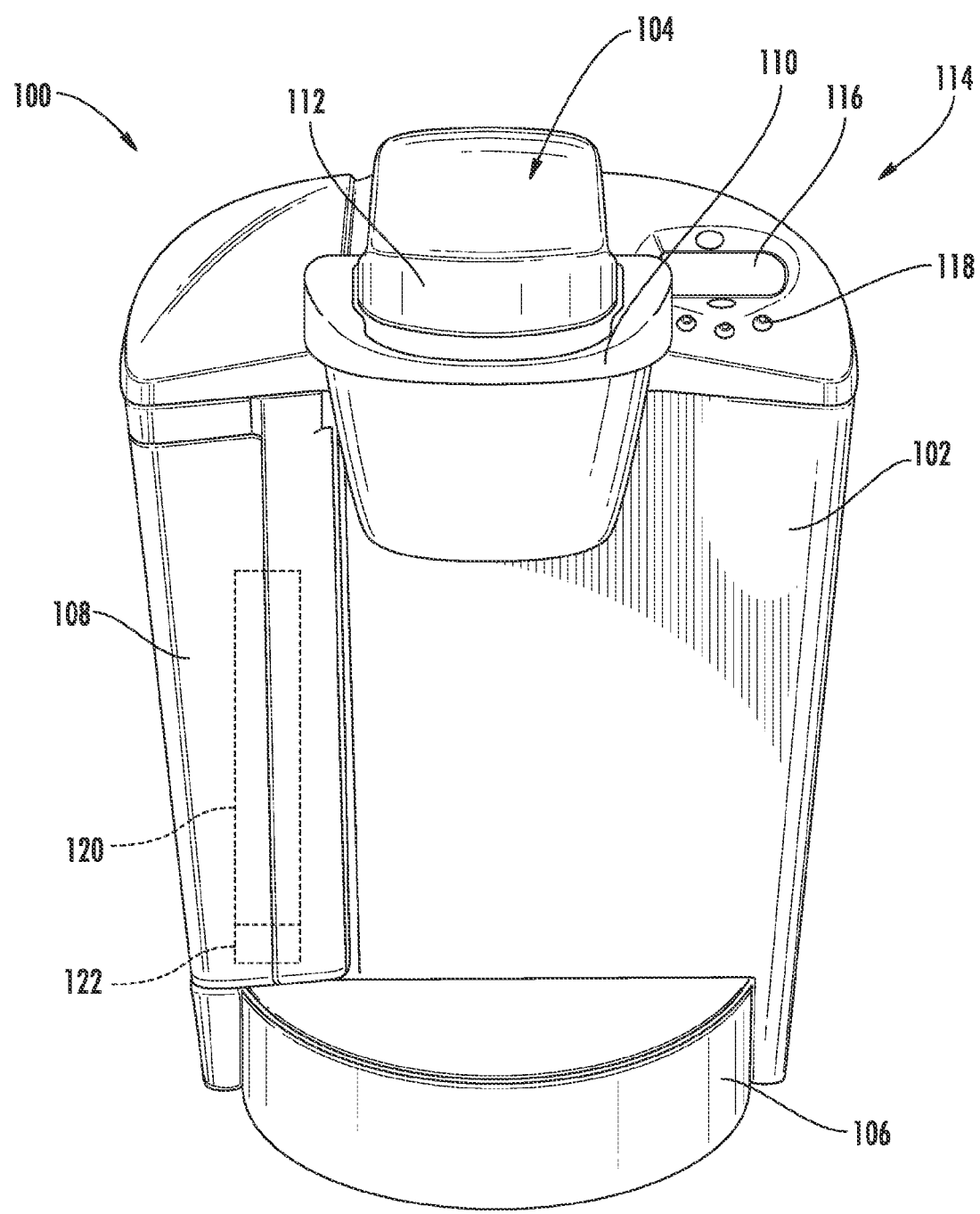
FIG. 1 provides a front, perspective view of a beverage dispenser according to an exemplary embodiment of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 provides a front, perspective view of a beverage dispenser 100 according to an exemplary embodiment of the present subject matter. Beverage dispenser 100 is generally referred to as a "single serve beverage dispenser 100" and receives capsules or pods with flavorings therein that are brewed or mixed with hot or cold water to provide a hot or cold beverage, as desired. As an example, beverage dispenser 100 may be a KEURIG® brand single-cup coffee brewing system or a VERISMO™ brand single-cup coffee brewing system. However, beverage dispenser 100 may alternatively be any other suitable beverage dispenser.

As may be seen in FIG. 1, beverage dispenser 100 includes a body 102, a dispenser portion 104, a pan or tray 106, and a reservoir 108. A lever 110 is provided with dispenser portion 104 to allow a user to open a lid 112 of dispenser portion 104 and access a receptacle (not shown) for receiving a capsule or pod. During brewing or mixing operations, water may be taken from the reservoir 108, heated or cooled, and provided to dispenser portion 104, wherein dispenser portion 104 either brews or mixes the water with the contents of the capsule or pod to provide a desired beverage. The beverage may be dispensed into a cup or mug (not shown) placed on tray 106 by a user. The exemplary beverage dispenser 100 also includes a control panel 114 including a display 116 and a plurality of user inputs 118 allowing the user to control operation of beverage dispenser 100.

It should be appreciated, however, that the present disclosure is not limited to any specific beverage dispenser 100, and in other exemplary embodiments, beverage dispenser 100 may have any other suitable configuration.

As will be explained in greater detail below, and as is depicted in phantom in FIG. 1, a water filter assembly 120 is positioned in the reservoir 108 and attached to a fitting 122 of the reservoir 108. Water filter assembly 120 is generally provided to remove contaminants and particles in the water in reservoir 108 through, e.g., mechanical filtration and/or absorption of such contaminants.

Figure 2:
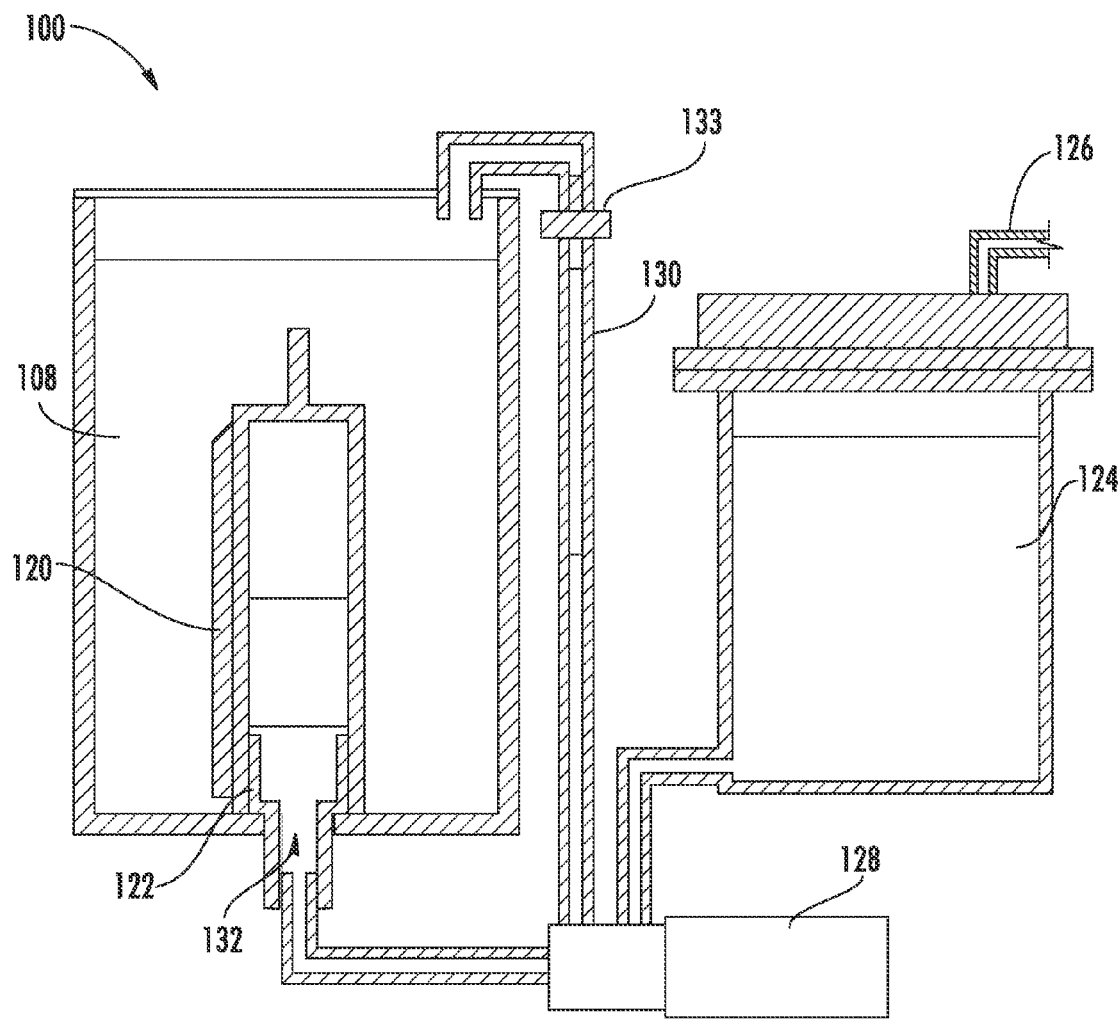
FIG. 2 provides a schematic diagram of a portion of the exemplary beverage dispenser of FIG. 1.

Referring now to FIG. 2, a schematic diagram is provided of a portion of the exemplary beverage dispenser 100 of FIG. 1. As is depicted, beverage dispenser 100 further includes a hot water chamber 124 and a pump 128. Hot water chamber 124 is configured to provide dispenser portion 104 with heated water via a conduit 126. Additionally, pump 128 is in flow communication with reservoir 108 and is configured to provide a flow of water from the reservoir 108 to the hot water chamber 124 when activated. Pump 128 may be a centrifugal pump, or alternatively may be any other suitable pump.

A priming vent 130 is provided in flow communication with the pump 128 and the reservoir 108 for providing a flow of water from the pump 128 to the reservoir 108 during a priming operation of the pump 128. More particularly, priming vent 130 is provided to allow a pump head (not shown) of the pump 128 to flood with water during priming operations.

Moreover, as schematically depicted, water filter assembly 120 is positioned in reservoir 108 and attached to fitting 122 in reservoir 108. More particularly, reservoir 108 defines an outlet 132 fluidly connected to hot water chamber 124 via pump 128 for providing water to the hot water chamber 124. During operation of the beverage dispenser 100, pump 128 may pull water from reservoir 108, through water filter assembly 120, and provide such water to the hot water chamber 124. Water from the hot water chamber 124 may then be provided to dispenser portion 104, wherein such water may be brewed or mixed with contents of any capsules or pods positioned therein. As previously discussed, the desired beverage may then be dispensed via dispenser portion 104 to a user.

During operation, if a pressure drop across water filter assembly 120 is greater than a certain threshold, fluid may be pulled from priming vent 130 as opposed to reservoir 108. The fluid may initially be water, however, it may also include air. If such fluid is allowed to be so pulled from priming vent 130 to pump 128 such that air is provided to pump 128, the air may cause pump 128 to cavitate and not operate properly. Accordingly, in certain exemplary embodiments of the present disclosure, beverage dispenser 100 may further include a one-way valve 133 positioned in priming vent 130 for preventing a flow of fluid in a flow direction away from reservoir 108 through priming vent towards pump 128. One-way valve 133 may have any suitable configuration. Inclusion of one-way valve 133 may allow for proper operation of beverage dispenser 100, or more particularly proper operation of pump 128, regardless of a pressure drop across water filter assembly 120 greater than a certain threshold.

Figure 3:
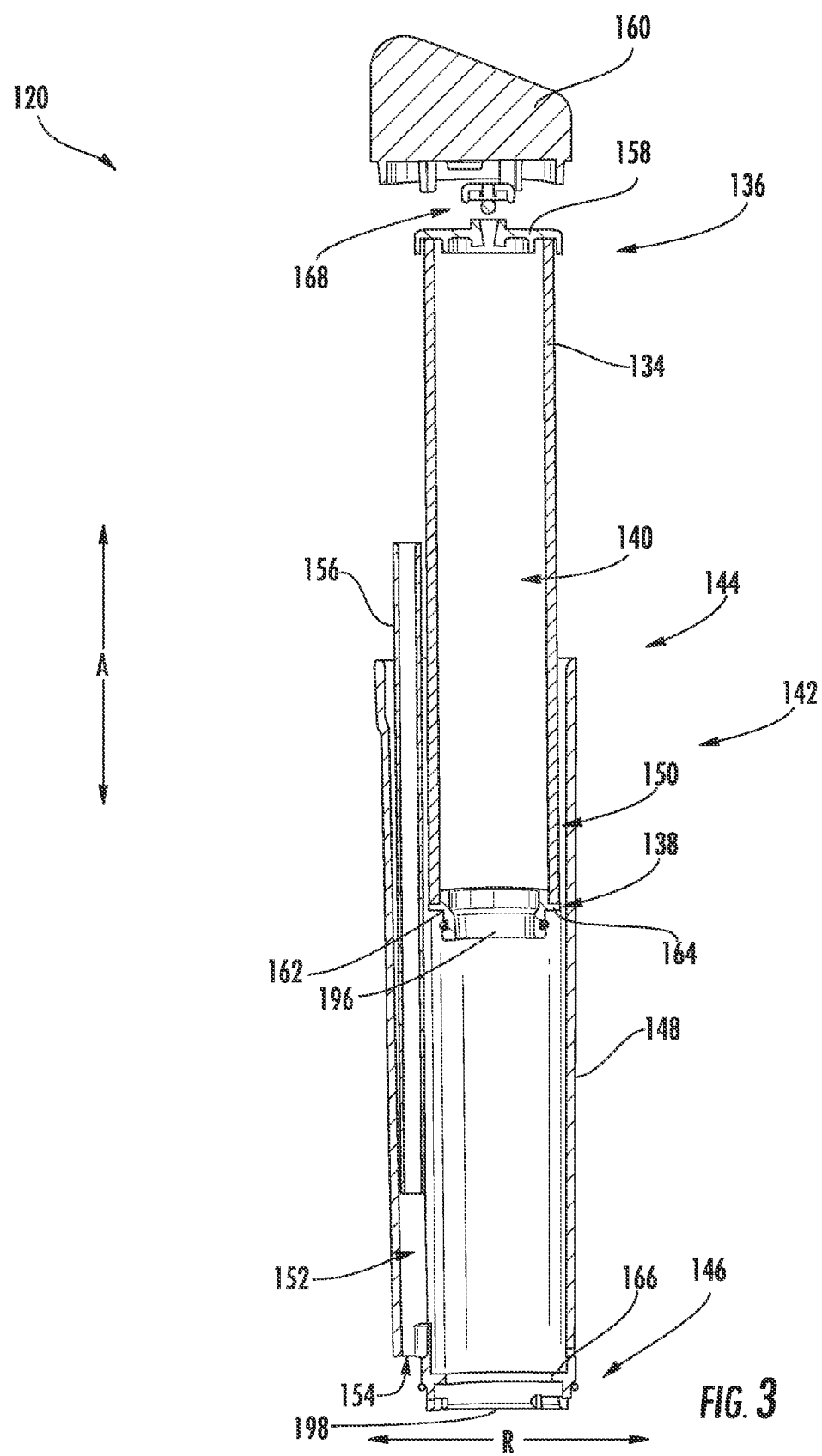
FIG. 3 provides an exploded cross-sectional view of a water filter assembly in accordance with an exemplary embodiment of the present disclosure.
Figure 4:
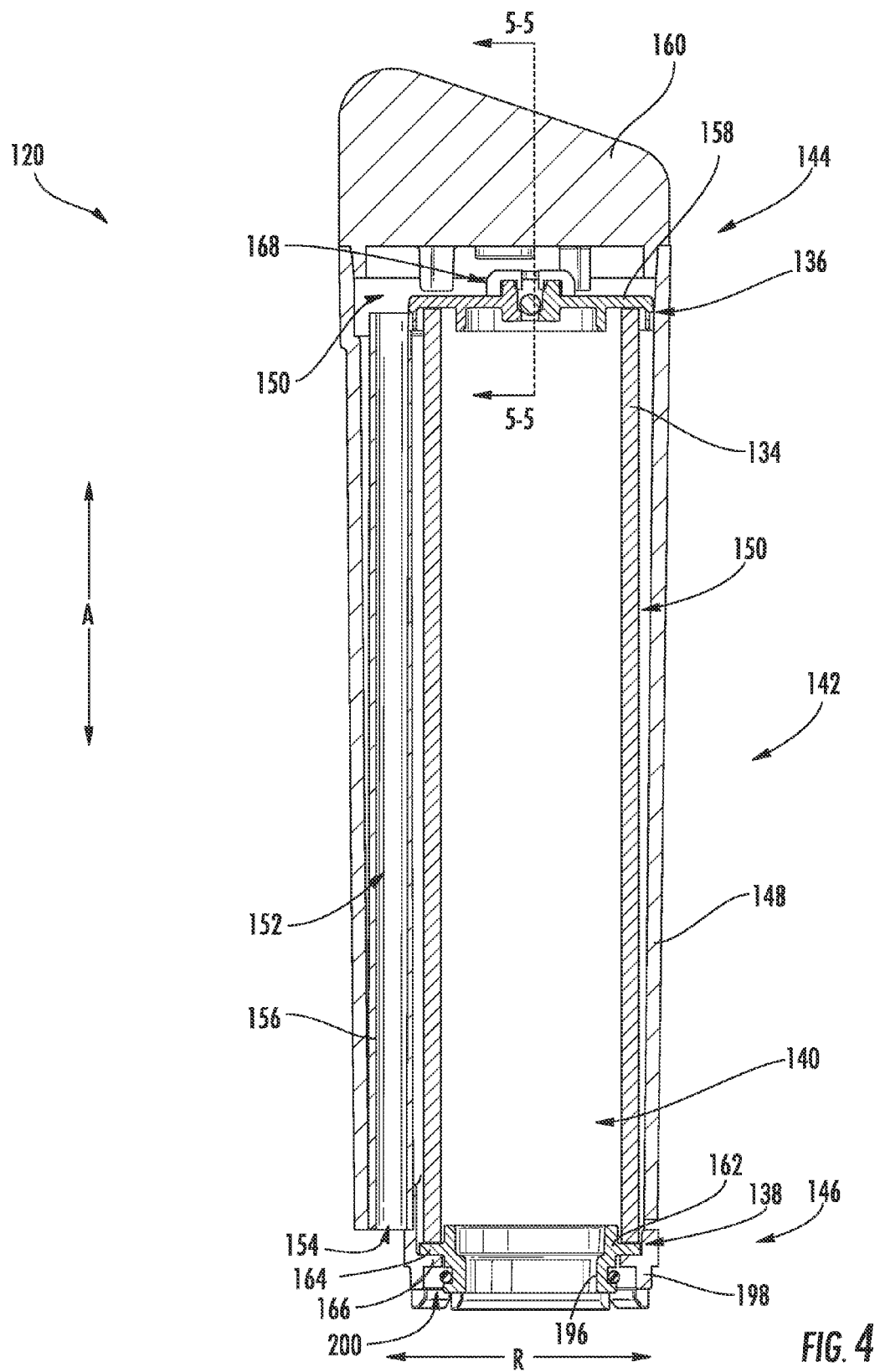
FIG. 4 provides an assembled cross-sectional view of the exemplary water filter assembly of FIG. 3.

Referring now to FIGS. 3 and 4, cross-sectional views of a water filter assembly 120 in accordance with an exemplary embodiment of the present disclosure are provided. More particularly, FIG. 3 provides an exploded cross-sectional view of a water filter assembly 120 in accordance with an exemplary embodiment of the present disclosure, and FIG. 4 provides an assembled cross-sectional view of the exemplary water filter assembly 120 of FIG. 3. As shown, the water filter assembly 120 defines an axial direction A and a radial direction R. In certain embodiments, the axial direction A of water filter assembly 120 may be aligned with a vertical direction, however in other embodiments, water filter assembly 120 may be aligned in any other suitable orientation.

Water filter assembly 120 includes a filter medium 134 extending along the axial direction A between a first end 136 and a second end 138—filter medium 134 defining interior filtered water chamber 140. For the embodiment depicted, filter medium 134 is a cylindrical filter medium configured to filter water flowing inward generally along the radial direction and may be formed of, for example, an activated carbon medium. However, in other embodiments, filter medium 134 may be formed of any other suitable material. For example, in other exemplary embodiments, filter medium 134 may be formed of one or more layers of fine mesh.

Filter medium 134 is enclosed by a housing 142 also extending along the axial direction A between a first end 144 and a second end 146. More particularly, filter medium 134 is enclosed by a body portion 148 of housing 142 defining a generally cylindrical shape extending along the axial direction A. First end 144 of housing 142 is positioned proximate to first end 136 of filter medium 134 and second end 146 of housing 142 is positioned proximate to second end 138 of filter medium 134. Housing 142 and filter medium 134 together define an unfiltered water chamber 150 between the housing 142 and filter medium 134. For the embodiment depicted, the unfiltered water chamber 150 includes a generally annular chamber between body portion 148 and filter medium 134, as well as a volume above filter medium 134 at first end 144 of housing 142 and first end 136 of filter medium 134.

Body portion 148 of housing 142 additionally defines an inlet 154 proximate to second end 146 of housing 142 for receipt of unfiltered water from, e.g., reservoir 108. More particularly, housing 142 defines a channel 152, with the inlet 154 defined at an end of the channel 152 prosimate to second end 146 of housing 142. Channel 152 extends from second end 146 of housing 142 proximate to first end 144 of housing 142 to provide unfiltered water to the unfiltered water chamber 150 at a location proximate to first end 144 of housing 142. For the embodiment depicted in FIGS. 3 and 4, housing 142 further includes a siphon tube 156 positioned in channel 152 extending from inlet 154 of channel 152 to a location proximate first end 144 of housing 142. More particularly, siphon tube 156 extends from inlet 154 of channel 152 at second end 146 of housing 142 to first end 144 of housing 142. In alternative embodiments, however, housing 142 may not include channel 152 or tube 154, or alternatively, housing 142 may not include channel 152 and tube 154 may extend and be positioned on an outside of housing 142.

A first filter cap 158 is positioned over first end 136 of filter medium 134 to cover interior filtered water chamber 140 of filter medium 134. First filter cap 158 may be attached to first end 136 of filter medium 134 in any suitable manner. For example, first filter cap 158 may be attached to first end 136 of filter medium 134 using a glue or other suitable epoxy. Notably, first filter cap 158 may seal interior filtered water chamber 140 from unfiltered water chamber 150 at first end 136 of filter medium 134. Accordingly, unfiltered water provided to unfiltered water chamber 150 by siphon tube 156 in channel 152 must flow through filter medium 134 to reach interior filtered water chamber 140. Such a configuration may allow for a relatively high-performance filtering of water in reservoir 108 while minimizing a pressure drop across water filter assembly 120. More particularly, with such a configuration, unfiltered water is provided to first end 136 of filter medium 134 and may saturate substantially all of a surface area of filter medium 134 by filling unfiltered water chamber 150 from a top end. The unfiltered water in unfiltered water chamber 150 may then flow from unfiltered water chamber 150 inwardly along the radial direction R to interior filtered water chamber 140. As such a configuration may utilize substantially all of the surface area of filter medium 134, a pressure drop across water filter assembly 120 may remain within an acceptable limit of beverage dispenser 100.

Moreover, such a configuration provides for utilization of substantially all of the surface area of filter medium 134 regardless of a water level in reservoir 108. More particularly, siphon tube 156 and channel 152 may ensure unfiltered water is provided to unfiltered water chamber 150 proximate to first end 144 of housing 142 and first end 136 of filter medium 134. Accordingly, substantially all of the surface area of filter medium 134 may be utilized even when a water level in reservoir 108 is below first end 144 of housing 142 and first end 136 of filter medium 134. It should be appreciated, that as used herein, terms of approximation, such as "substantially" and "approximately," refer to being within a ten percent margin of error.

Referring still to FIGS. 3 and 4, housing 142 further includes a housing cap 160 positioned at first end 144 of housing 142 covering body portion 148 of housing 142. In certain embodiments, housing cap 160 may be attached to body portion 148 of water filter assembly 120 using an interference fit and/or a spin welding attachment method. However, in other embodiments, housing cap 160 may be attached to body portion 148 using any other suitable attachment means or mechanism to form a hermetic seal. Alternatively, in still other embodiments one or more portions of housing cap 160 may be formed integrally with body portion 148.

Water filter assembly 120 further includes a second filter cap 162 positioned at second end 138 of filter medium 134. Second filter cap 162 is configured for sealing second end 138 of filter medium 134 to housing 142. More particularly, second filter cap 162 includes a flange 164 extending outwardly along the radial direction R. Similarly, second end 146 of housing 142 includes a corresponding flange 166 extending inwardly along the radial direction R. Flange 164 of second filter cap 162 is positioned between the second end 146 of filter medium 134 and flange 166 of second end 138 of housing 142.

In certain embodiments, flange 164 of second filter cap 162 may be attached to second end 138 of filter medium 134 and/or flange 166 of second end 146 of housing 142 using a glue or any other suitable epoxy. Additionally, or alternatively, flange 164 of second filter cap 162 may be attached to second end 138 of filter medium 134 and/or flange 166 of second end 146 of housing 142 by applying a grease. Moreover, it should be appreciated, that in still other embodiments, flange 164 of second filter cap 162 may be attached to second end 138 of filter medium 134 and/or flange 166 of second end 146 of housing 142 in any other suitable manner, or alternatively may not be attached and instead one or more of the various components may be sealed by designing water filter assembly 120 with relatively close tolerances.

Figure 5:
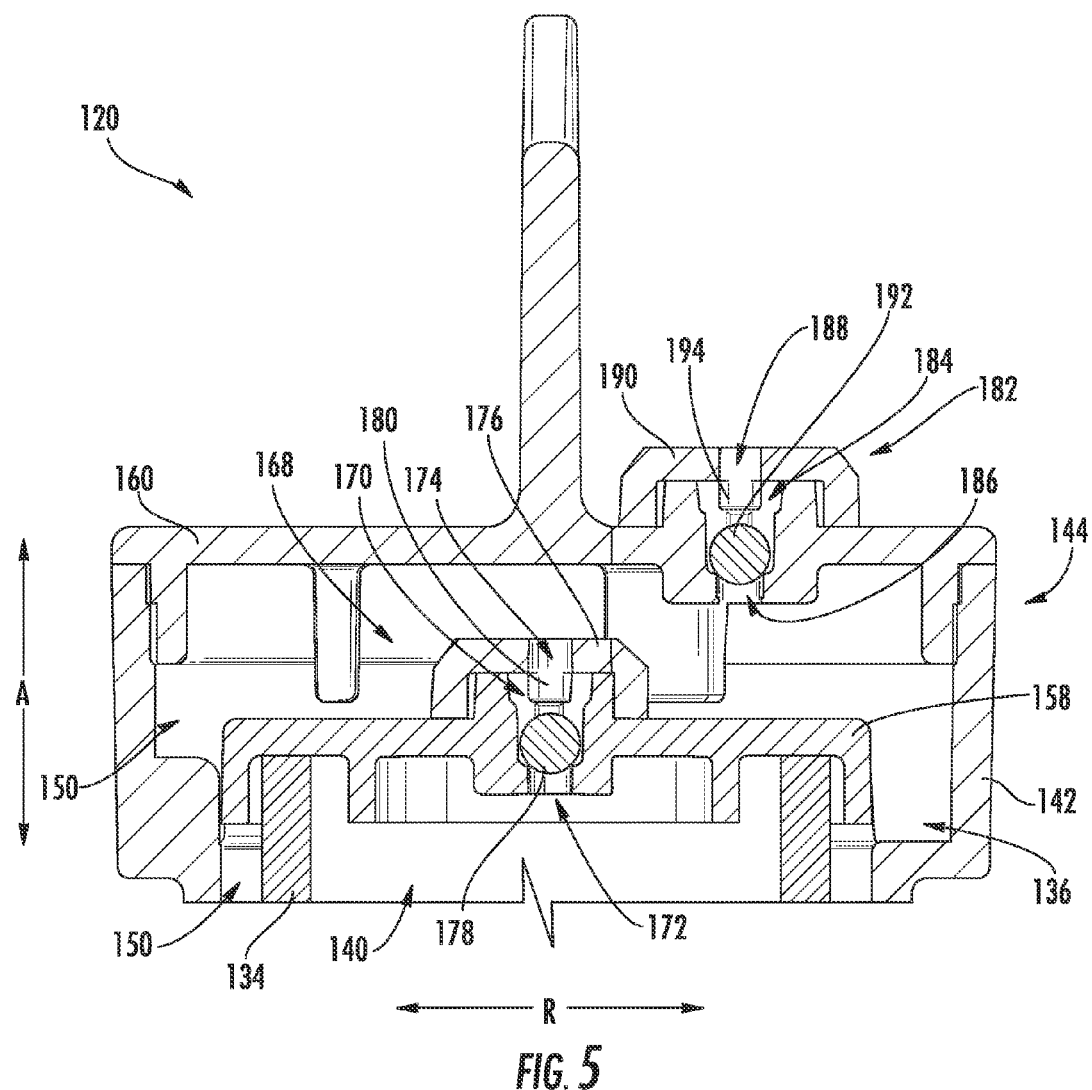
FIG. 5 provides a close up, cross-sectional view of the exemplary water filter assembly of FIG. 4 taken along Line 5-5 of FIG. 4.

Referring now particularly to FIG. 5, a cross-sectional view of the exemplary water filter assembly 120 of FIGS. 3 and 4 is provided, taken along Line 5-5 of FIG. 4. More particularly, FIG. 5 provides a close up cross-sectional view of first end 144 of housing 142 and first end 136 of filter medium 134 of exemplary water filter assembly 120 of FIGS. 3 and 4.

During certain events, air may make its way into one or both of interior filtered water chamber 140 and unfiltered water chamber 150. For example, air may be present in one or both of interior filtered water chamber 140 and unfiltered water chamber 150 when water filter assembly 120 is first installed in reservoir 108 of beverage dispenser 100, or alternatively, when an amount of water in reservoir 108 is depleted. However, in order to properly function (e.g., in order for siphon tube 156 to effectively provide unfiltered water to unfiltered water chamber 150 proximate to first end 144 of housing 142), it is generally beneficial for interior filtered water chamber 140 and unfiltered water chamber 150 to be filled with water.

Accordingly, as is depicted, first filter cap 158 includes a one-way valve 168 allowing for a flow of fluid from interior filtered water chamber 140 to unfiltered water chamber 150. For the embodiment depicted, one-way valve 168 in first filter cap 158 is configured as an inverse frustoconical opening 170 with a bottom hole 172 defined adjacent to interior filtered water chamber 140 and a top hole 174—defined in a cover 176—positioned adjacent to unfiltered water chamber 150. Cover 176 may be attached to first filter cap 158 in any suitable manner. For example, in certain exemplary embodiments, cover 176 may be attached to first filter cap 158 using an ultrasonic welding process. However, in other exemplary embodiments, cover 176 may instead be attached to first filter cap 158 using, e.g., glue or other mechanical fastening means, or alternatively, at least a portion of cover 176 may be formed integrally with first filter cap 158.

Referring still to one-way valve 168 in first filter cap 158, a ball 178 is positioned in opening 170 and configured to cover bottom hole 172 to prevent fluid from traveling from unfiltered water chamber 150 to interior filtered water chamber 140. Additionally, ball 178 is configured to move upwards in response to a pressure differential greater than a predetermined amount across one-way valve 168—i.e., when a pressure in interior filtered water chamber 140 is more than a predetermined amount greater than a pressure in unfiltered water chamber 150—and rest against a stop 180 extending into opening 170 from cover 176 such that fluid may flow around ball 178, through top hole 174, and into unfiltered water chamber 150. Notably, ball 178 is not biased towards resting against bottom hole 172 (i.e., a closed position) other than by any force on ball 178 exerted by gravity. The predetermined amount of pressure differential for ball 178 to move up and allow a flow through opening 170 in certain exemplary embodiments may accordingly be relatively low. For example, in certain embodiments, ball 178 may be configured to move upwards when the pressure differential is less than or equal to one inch of water pressure. Additionally, for the embodiment depicted, ball 178 may be formed of a non-buoyant elastomeric material. However, in other exemplary embodiments, ball 178 may be formed of any other suitable material and the pressure differential may be any other suitable pressure differential.

As is also depicted in FIG. 5, housing cap 160 similarly includes a one-way valve 182 allowing for a flow of fluid from unfiltered water chamber 150 to, e.g., reservoir 108. For the embodiment depicted, one-way valve 182 in housing cap 160 is configured in substantially the same manner as one-way valve 168 in first filter cap 158. For example, one-way valve 182 in housing cap 160 also includes an inverse frustoconical opening 184 with a bottom hole 186 defined adjacent to unfiltered water chamber 150 and a top hole 188 defined in a cover 190 positioned adjacent to, e.g., reservoir 108. Moreover, a ball 192 is positioned in the opening 184 configured to cover bottom hole 186 to prevent fluid from traveling from, e.g., reservoir 108 to unfiltered water chamber 150. As with ball 178 of one-way valve 168 in first filter cap 158, ball 192 is configured to move upwards in response to a pressure differential greater than a predetermined threshold across one-way valve 182 and rest against a stop 194 extending into opening 184 such that fluid may flow around ball 192 and through top hole 188. Further, the predetermined amount of pressure differential in certain exemplary embodiments may also be relatively low, such as less than or equal to one inch of water pressure, and ball 192 may be formed of a non-buoyant elastomeric material.

It should be appreciated, however, that in alternative embodiments, one or more of one-way valve 182 in housing cap 160 and one-way valve 168 in first filter cap 158 may be configured in any other suitable manner. For example, in other exemplary embodiments, one or both of one-way valve 182 in housing cap 160 and one-way valve 168 in first filter cap 158 may be configured as an umbrella type one-way valve, a duckbill type one-way valve, or any other suitable one-way valve.

Figure 6:
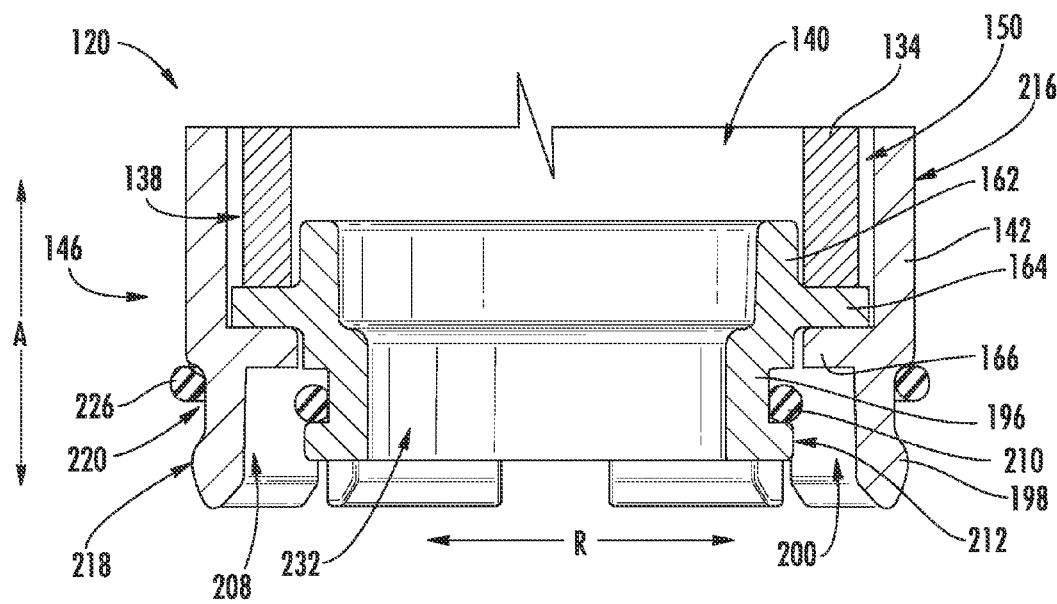
FIG. 6 provides a close up, cross-sectional view of the exemplary water filter assembly of FIG. 4.
Figure 7:
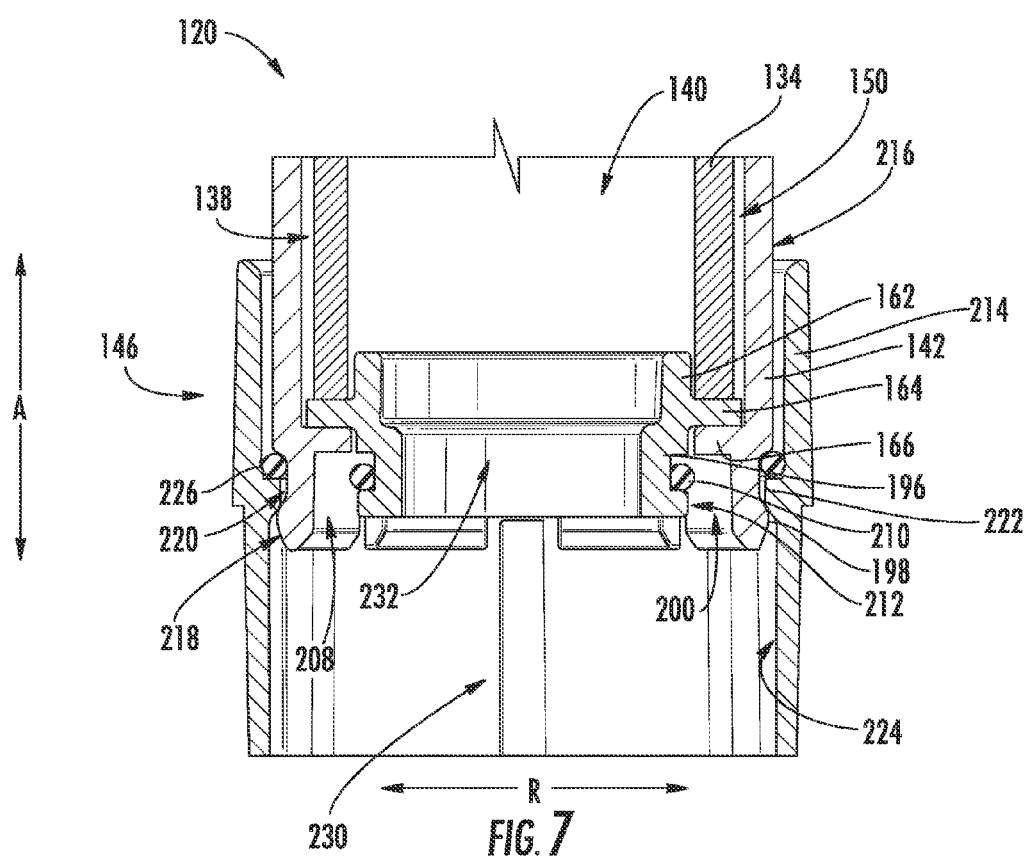
FIG. 7 provides another close up, cross-sectional view of the exemplary water filter assembly of FIG. 4, with the addition of a stability adapter.
Figure 8:
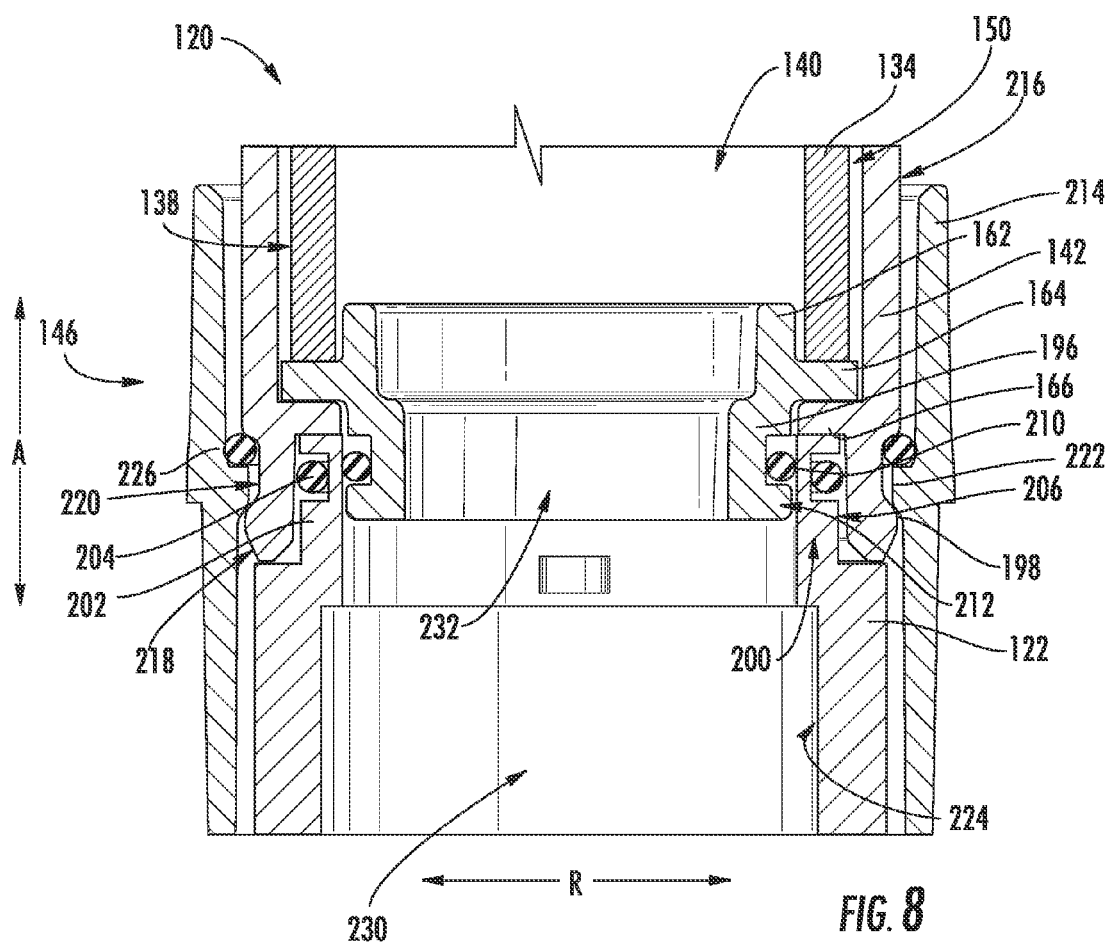
FIG. 8 provides yet another close up, cross-sectional view of the exemplary water filter assembly of FIG. 4 attached to a fitting in accordance with an exemplary embodiment of the present disclosure.

Referring now to FIGS. 6 through 8, close-up cross-sectional views of second end 146 of housing 142 and second filter cap 162 are provided. More particularly, FIG. 6 provides a close up cross-sectional view of second end 146 of housing 142 and second filter cap 162; FIG. 7 provides a close up cross-sectional view of second end 146 of housing 142 with a stability adapter 214 attached thereto; and FIG. 8 provides a close-up cross-sectional view of second end 146 of housing 142 attached to fitting 122 over outlet 132 of reservoir 108.

As shown, second filter cap 162 additionally defines a cylindrical sleeve 196 extending away from filter medium 134 along the axial direction A. More particularly, cylindrical sleeve 196 of first filter cap 158 extends along the axial direction A away from radial flange 164 of first filter cap 158. Similarly, housing 142 defines a cylindrical sleeve 198 extending away from filter medium 134 and away from flange 166 of housing 142 along the axial direction A. For the embodiment depicted, cylindrical sleeve 196 of second filter cap 162 is positioned inwardly along the radial direction R from cylindrical sleeve 198 of housing 142. Accordingly, cylindrical sleeve 196 of second filter cap 162 and cylindrical sleeve 198 of housing 142 together define a slot 200. For the embodiment depicted, the slot 200 is configured for receipt of fitting 122 surrounding outlet 132 of reservoir 108 (see FIG. 8).

As shown in FIG. 8, fitting 122 includes a neck 202 received in slot 200 of water filter assembly 120. Neck 202 includes a seal 204 extending circumferentially around an outer surface 206 of neck 202. For the embodiment depicted, seal 204 extending circumferentially around outer surface 206 of neck 202 is an O-ring seal positioned in an annular indentation in outer surface 206 of neck 202. With such a configuration, seal 204 may form a fluid tight seal with water filter assembly 120, or more particularly with an inner surface 208 of cylindrical sleeve 198 of housing 142.

Water filter assembly 120 additionally includes a seal 210 extending circumferentially around an outer surface 212 of cylindrical sleeve 196 of second filter cap 162. Seal 210 extending circumferentially around the outer surface 212 of cylindrical sleeve 196 of second filter cap 162 is configured to contact neck 202 of fitting 122 and form a seal between cylindrical sleeve 196 of second filter cap 162 and neck 202 of fitting 122. For the embodiment depicted, seal 210 extending around outer surface 212 of cylindrical sleeve 196 of second filter cap 162 is configured as an O-ring seal positioned in an annular indentation in outer surface 212 of cylindrical sleeve 196 of second filter cap 162. However, in other exemplary embodiments, any other suitable seal may be provided. Seal 210 may better effectuate the fluid tight seal between water filter assembly 120 and fitting 122, especially when, for example, seal 204 of fitting 122 is missing or damaged.

Referring to FIGS. 7 and 8, exemplary water filter assembly 120 depicted further includes a stability adapter 214 defining a cylindrical shape. The stability adapter 214 is removably attached to and contacts an outer surface 216 of housing 142 at second end 146 of housing 142. Moreover, stability adapter 214 at least partially surrounds second end 146 of housing 142. As shown, stability adapter 214 extends past second end 146 of housing 142 along the axial direction A for contacting fitting 122 surrounding outlet 132 of reservoir 108 (FIG. 8). Stability adapter 214 may be attached to second end 146 of housing 142 by sliding over second end 146 of housing 142 along the axial direction A.

Additionally, stability adapter 214 and housing 142 include features for holding stability adapter 214 in place relative to housing 142. For the embodiment depicted, an outer surface 218 of cylindrical sleeve 198 of housing 142 includes an indentation 220 extending generally inward along the radial direction R and circumferentially around housing 142. Similarly, stability adapter 214 includes a ridge 222 also extending generally inwardly along the radial direction R from an inner surface 224 of stability adapter 214 and circumferentially around inner surface 224 of stability adapter 214. Ridge 222 of stability adapter 214 may "snap" into indentation 220 of cylindrical sleeve 198 to hold stability adapter 214 in position relative to housing 142. Moreover, as is depicted, water filter assembly 120 further includes a seal 226 extending around inner surface 224 of stability adapter 214 adjacent to ridge 222 and around outer surface 218 of cylindrical sleeve 198 in indentation 220. As shown, seal 226 contacts outer surface 218 of cylindrical sleeve 198 of housing 142 and inner surface 224 of stability adapter 214, providing for a tighter fit between stability adapter 214 and housing 142.

Figure 9:
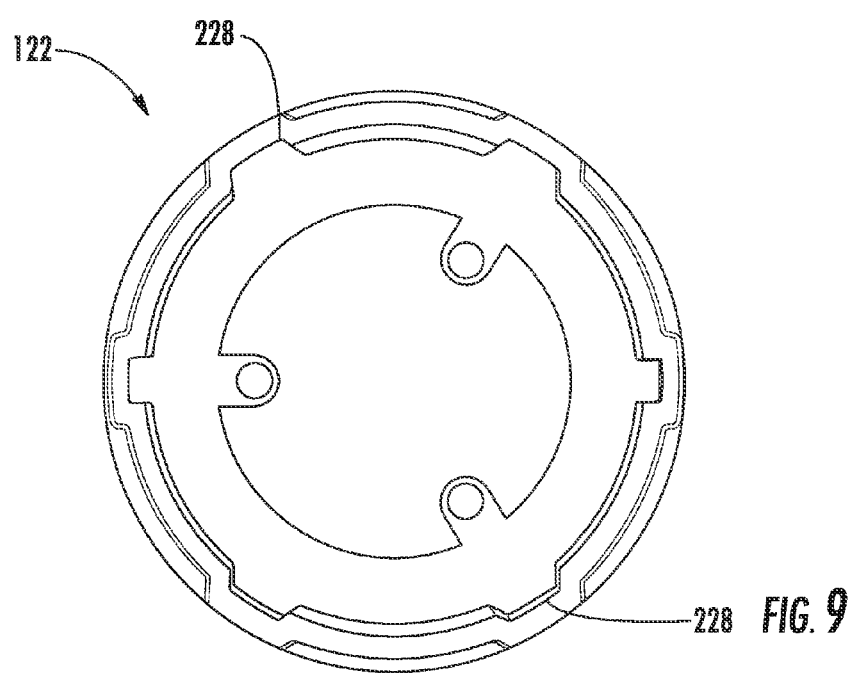
FIG. 9 provides a top view of the exemplary fitting of FIG. 8.

Referring now briefly to FIG. 9, a top view of an exemplary fitting 122 surrounding outlet 132 of reservoir 108 is provided. As shown, fitting 122 is generally circular in shape and includes ridges 228 circumferentially spaced about an outer surface of fitting 122. Ridges 228 may also extend generally along the axial direction A. Stability adapter 214 may have features configured to interact with such ridges 228 to increase a stability of water filter assembly 120 when attached to fitting 122. More particularly, as is shown in FIG. 7, for example, stability adapter 214 may define axially extending slots 230 in inner surface 224 of stability adapter 214 configured to receive the ridges 228 of fitting 122. Such a configuration may provide for a more stable connection between fitting 122 and stability adapter 214.

When filter assembly is attached to fitting 122, an outlet 232 defined by housing 142 of water filter assembly 120, or more particularly, an outlet 232 defined by housing 142, second end of filter medium 134, and second filter cap 162 is fluidly connected to an outlet 132 of reservoir 108 over which fitting 122 is attached. Moreover, inclusion of stability adapter 214 may provide additional rigidity and stability in the attachment of water filter assembly 120 to fitting 122 over outlet 132 of reservoir 108. It should be appreciated, however, that in other exemplary embodiments, water filter assembly 120 may not include stability adapter 214. Instead, water filter assembly 120 may be attached to fitting 122 simply by receiving neck 202 of fitting 122 in slot 200 defined between cylindrical sleeve 198 of housing 142 and cylindrical sleeve 196 of second filter cap.

Figure 10:
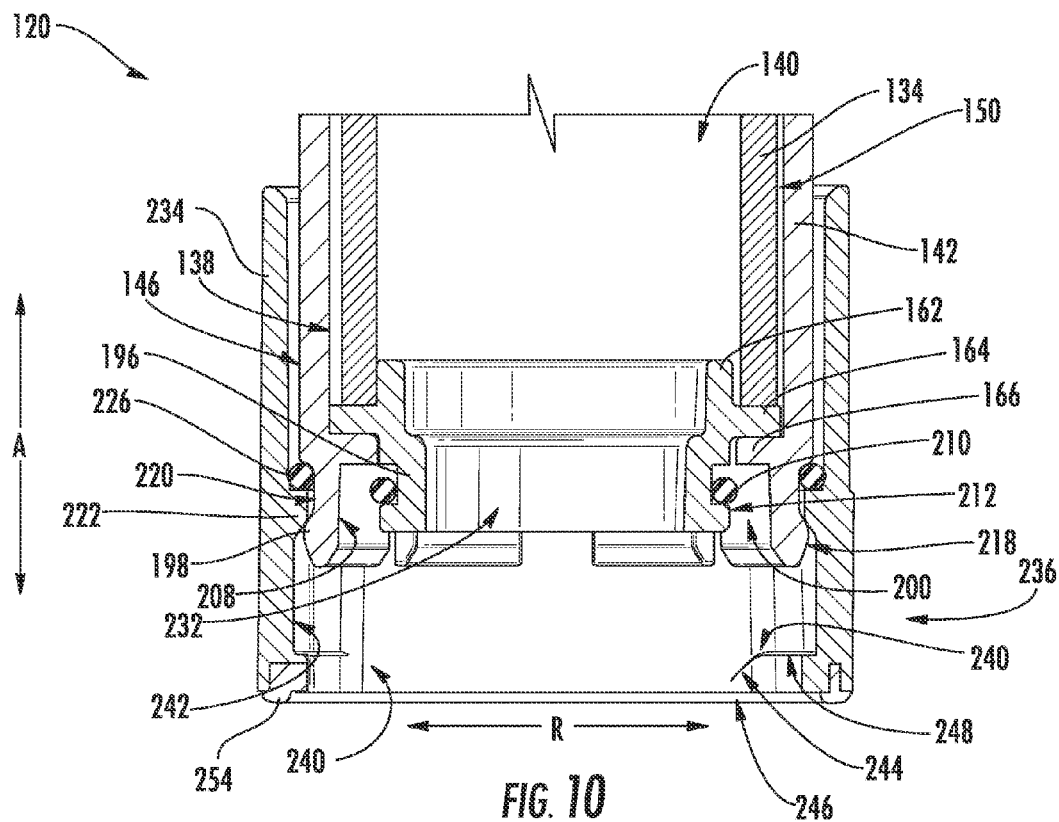
FIG. 10 provides a close up, cross-sectional view of a water filter assembly in accordance with another exemplary embodiment of the present disclosure, with an attachment adapter included.
Figure 11:
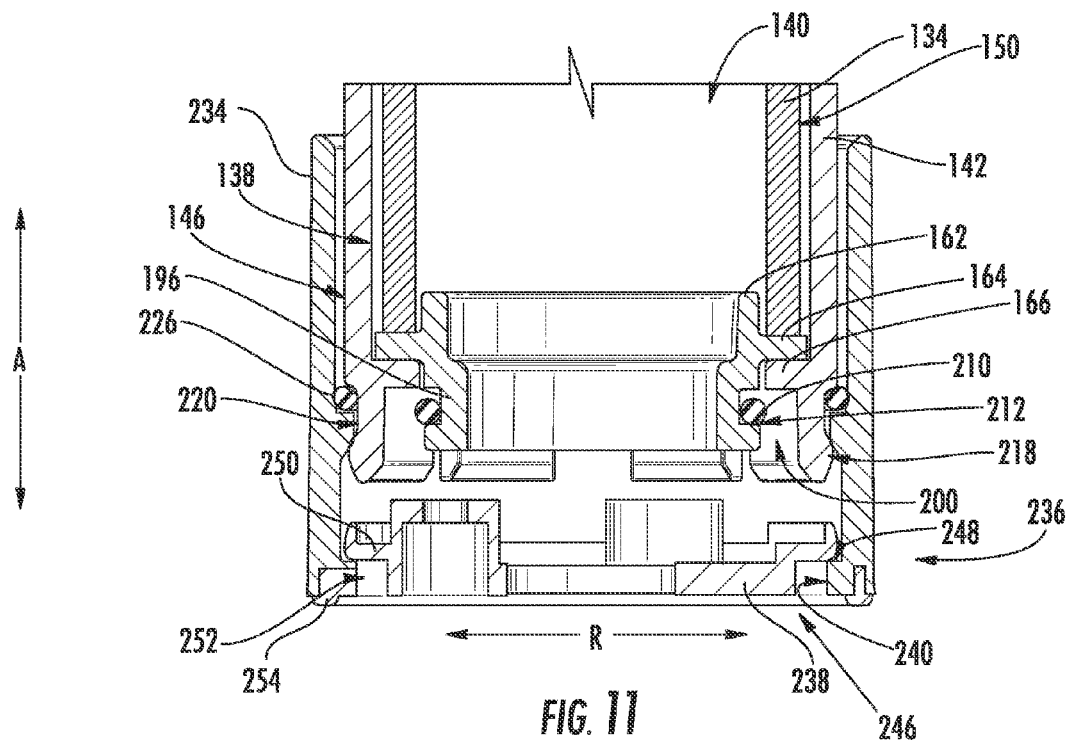
FIG. 11 provides another close up, cross-sectional view of the exemplary water filter assembly of FIG. 10, attached to a fitting in accordance with another exemplary embodiment of the present disclosure.
Figure 12:
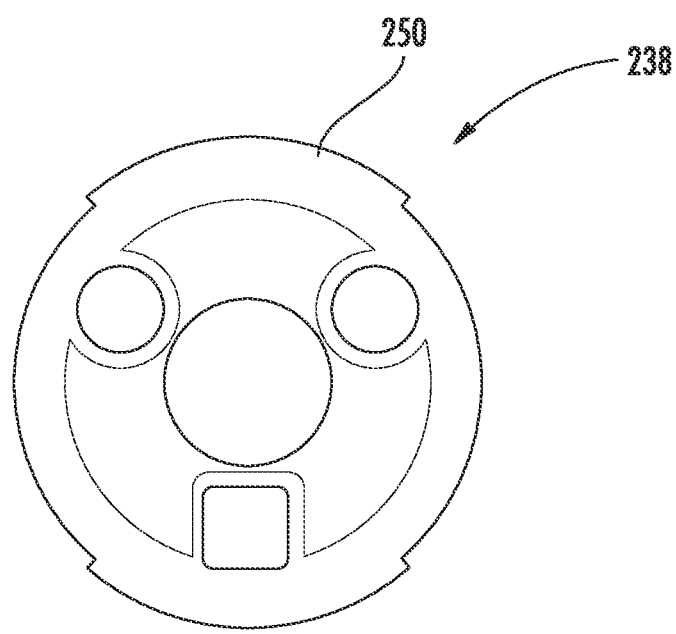
FIG. 12 provides a top view of the exemplary fitting of FIG. 11.

Referring now to FIGS. 10 through 12, a second exemplary embodiment of the present disclosure is provided. More particularly, FIG. 10 provides a cross-sectional view of a water filter assembly 120 in accordance with another exemplary embodiment of the present disclosure including an attachment adapter 234; FIG. 11 provides a cross-sectional view of the exemplary water filter assembly 120 of FIG. 10 attached to a fitting in accordance with another exemplary embodiment present disclosure; and FIG. 12 provides a top view of the exemplary fitting 238 of FIG. 11.

The exemplary water filter assembly 120 depicted in FIGS. 10 and 11 may be configured in substantially the same manner as the exemplary water filter assembly 120 discussed above. Accordingly, the same or similar numbering may refer to the same or similar parts. For example, as is depicted, the exemplary water filter assembly 120 of FIGS. 10 and 11 includes a filter medium 134 defining an interior filtered water chamber 140 and a second filter cap 162 attached to filter medium 134 at a second end 138 of filter medium 134. Exemplary water filter assembly 120 depicted further includes a housing 142 extending along the axial direction A and enclosing filter medium 134. Housing 142 and filter medium 134 together define an unfiltered water chamber 150 between housing 142 and filter medium 134.

However, for the embodiment of FIGS. 10 and 11, water filter assembly 120 does not include stability adapter 214. Instead, exemplary water filter assembly 120 of FIGS. 10 and 11 includes an attachment adapter 234. Attachment adapter 234 defines a generally cylindrical shape and is removably attached to an outer surface 216 of housing 142 at second end 146 of housing 142 such that attachment adapter 234 at least partially surrounds second end 146 of housing 142. Attachment adapter 234 also includes a connection portion 236 extending past second end 146 of housing 142 along the axial direction A for connection to fitting 122 surrounding outlet 132 of reservoir 108. Connection portion 236 of attachment adapter 234 includes one or more features extending inwardly along the radial direction R configured to engage with one or more corresponding features on a fitting 238 for attaching water filter assembly 120 to fitting 238. More particularly, as may be seen most clearly in FIG. 10, connection portion 236 of attachment adapter 234 includes a plurality of attachment features 240 circumferentially spaced around an inner surface 242 of attachment adapter 234 and extending inwardly along the radial direction R from inner surface 242. The attachment features 240 depicted include a ramp surface 244 defining a slope relative to an axial end 246 of attachment adapter 234 leading to a locking surface 248 which extends substantially parallel to axial end 246 of attachment adapter 234. Similar to fitting 122 described above, fitting 238 may be attached to reservoir 108 over outlet 132 of reservoir 108, using, e.g., one or more screws (not shown).

Referring still to FIG. 11, and also to FIG. 12, exemplary fitting 238 depicted includes a plurality of lips 250 extending outwardly along the radial direction R and defining a gap 252 with, e.g., a bottom plate of fitting 238 or a bottom surface of reservoir 108. The plurality of attachment features 240 extending inwardly along the radial direction R from inner surface 242 of attachment adapter 234 are configured to engage the lips 250 of the fitting 238 to connect attachment adapter 234 and water filter assembly 120 to fitting 238, and lock attachment adapter 234 and water filter assembly 120 in position.

The axial end 246 of attachment adapter 234 depicted in FIGS. 10 and 11 includes a seal 254. Seal 254 extends circumferentially around axial end 246 and is configured to contact and form a fluid tight seal with one or both of a bottom surface of reservoir 108 and a bottom plate of fitting 236 when water filter assembly 120 is attached to fitting 238 using attachment adapter 234. Such a configuration may therefore ensure water must pass through water filter assembly 120 prior to flowing through outlet 132 of reservoir 108. More particularly, with an attachment adaptor 234 in accordance with the exemplary embodiment depicted in FIGS. 10 and 11, seal 226 forms a fluid-tight seal between attachment adaptor 234 and housing 142, and seal 254 forms a fluid-tight seal between attachment adaptor 234 and the bottom of the reservoir 108, such that a fluidic seal is formed between outlet 132 of reservoir 108 and outlet 232 of housing 142 and filter medium 134.

A water filter assembly 120 in accordance with exemplary embodiments of FIGS. 10 and 11 may allow for a relatively easy and stable connection to the exemplary fitting 238 depicted. For example, to attach water filter assembly 120 with attachment adapter 234, a user may simply place connection portion 236 of attachment adapter 234 over fitting 238 and rotate fitting 238 until locking surface 248 of the plurality of attachment features 240 are positioned in the one or more gaps 252 defined by the plurality of lips 250 of fitting 238 with, e.g., a bottom plate of fitting 238 or a bottom surface of reservoir 108.

Moreover, it should be appreciated that the housing 142 and filter medium 134 of the exemplary embodiment of FIGS. 6 through 8 are substantially the same as the housing 142 and filter medium 134 of the exemplary embodiment of FIGS. 10 and 11. Moreover, as the stability adaptor 214 of FIGS. 7 and 8 and the attachment adaptor 234 of FIGS. 10 and 11 may each be removably attached to the housing 142, housing 142 and filter medium 134 of filter assembly 120 may be interchangeably used with a plurality of different fittings of different reservoirs/beverage dispensers.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A water filter assembly for a beverage dispenser having a reservoir, the reservoir having an outlet, the water filter assembly defining an axial direction and a radial direction, the axial direction aligned with a vertical direction, and comprising:
a filter medium extending along the axial direction and defining an interior filtered water chamber, the filter medium configured to filter water flowing inward generally along the radial direction into the interior filtered water chamber; and
a housing extending along the axial direction between a first end and a second end and enclosing the filter medium, the first end corresponding with a top end along the vertical direction and the second end corresponding with a bottom end along the vertical direction, the housing and the filter medium defining an unfiltered water chamber between the housing and the filter medium, the housing additionally defining an inlet in flow communication with the unfiltered water chamber proximate to the second end for receipt of unfiltered water from the reservoir, the housing further defining an outlet in flow communication with the interior filtered water chamber of the filter medium, the outlet of the housing positioned proximate the second end of the housing, the housing configured to provide filtered water through the outlet of the housing to the outlet of the reservoir;
wherein the housing further includes a housing cap positioned at the first end of the housing, and wherein the housing cap includes a one-way valve allowing for a flow of fluid from the unfiltered water chamber to the reservoir.

2. The water filter assembly of claim 1, wherein the housing additionally defines a channel, wherein the inlet of the housing is defined at an end of the channel proximate to the second end of the housing, the channel extending from the second end proximate to the first end to provide the unfiltered water to the unfiltered water chamber at a location proximate the first end of the housing.

3. The water filter assembly of claim 2, wherein the housing further includes a tube positioned in the channel extending from the inlet of the housing to a location proximate the first end of the housing.

4. The water filter assembly of claim 1, wherein the filter medium is a cylindrical filter medium, and wherein the unfiltered water chamber includes a generally annular chamber.

5. The water filter assembly of claim 1, further comprising a first filter cap, wherein the filter medium extends between a first end positioned proximate the first end of the housing and a second end positioned proximate the second end of the housing, wherein the first filter cap is positioned over the first end of the filter medium covering the interior filtered water chamber of the filter medium, and wherein the first filter cap includes a one-way valve allowing for the flow of the fluid from the interior filtered water chamber.

6. The water filter assembly of claim 1, further comprising a second filter cap, wherein the filter medium extends between a first end and a second end, wherein the second filter cap is positioned at the second end of the filter medium sealing the second end of the filter medium to the housing.

7. The water filter assembly of claim 6, wherein the second filter cap defines a cylindrical sleeve extending away from the filter medium along the axial direction, wherein the housing also defines a cylindrical sleeve extending away from the filter medium along the axial direction, wherein the cylindrical sleeve of the second filter cap is positioned inward along the radial direction from the cylindrical sleeve of the housing such that the cylindrical sleeve of the second filter cap and the cylindrical sleeve of the housing together define a slot, and wherein the slot is configured for receipt of a fitting surrounding the outlet of the reservoir.

8. The water filter assembly of claim 7, wherein the cylindrical sleeve of the second filter cap includes a seal extending around an outer surface of the cylindrical sleeve, the seal configured to contact the fitting surrounding the outlet of the reservoir and to form a seal between the cylindrical sleeve of the second filter cap and the fitting surrounding the outlet of the reservoir.

9. The water filter assembly of claim 1, further comprising a stability adaptor defining a cylindrical shape, wherein the stability adaptor contacts an outer surface of the housing at the second end of the housing, wherein the stability adapter at least partially surrounds the second end of the housing and is removably attached to the second end of the housing, and wherein the stability adaptor extends past the second end of the housing along the axial direction for contacting a fitting surrounding the outlet of the reservoir.

10. The water filter assembly of claim 9, wherein the stability adaptor defines a seal extending around an inner surface of the stability adaptor and contacting the outer surface of the housing.

11. The water filter assembly of claim 1, further comprising
an attachment adaptor defining a cylindrical shape, wherein the attachment adaptor is removably attached to an outer surface of the housing at the second end of the housing and at least partially surrounds the second end of the housing, wherein the attachment adaptor includes a connection portion extending past the second end of the housing along the axial direction for connection to a fitting surrounding the outlet of the reservoir.

12. The water filter assembly of claim 11, wherein the connection portion of the attachment adaptor defines an axial end, and wherein the axial end includes a seal configured to form a seal with one or both of the reservoir and the fitting surrounding the outlet of the reservoir when the water filter assembly is attached to the fitting using the attachment adaptor.

13. The water filter assembly of claim 11, wherein the connection portion of the attachment adaptor includes one or more features extending inwardly along the radial direction configured to engage with one or more corresponding features on the fitting surrounding the outlet of the reservoir for attaching the water filter assembly to the fitting surrounding the outlet of the reservoir.

14. A beverage dispenser comprising:
a dispenser;
a hot water chamber for providing the dispenser with heated water;
a reservoir defining an outlet and including a fitting attached to the reservoir and at least partially surrounding the outlet, the outlet of the reservoir fluidly connected to the hot water chamber for providing water to the hot water chamber; and
a water filter assembly positioned in the reservoir and attached to the fitting of the reservoir, the water filter assembly defining an axial direction and a radial direction and including
a filter medium extending along the axial direction and defining an interior filtered water chamber, the filter medium configured to filter water flowing inward generally along the radial direction into the interior filtered water chamber; and
a housing extending along the axial direction between a first end and a second end and enclosing the filter medium, the housing and the filter medium defining an unfiltered water chamber between the housing and the filter medium, the housing additionally defining an inlet in flow communication with the unfiltered water chamber proximate to the second end for receipt of unfiltered water from the reservoir, the housing further defining an outlet in flow communication with the interior filtered water chamber of the filter medium, the housing configured to provide filtered water through the outlet of the housing to the outlet of the reservoir through the fitting at the second end of the housing;
wherein the housing further includes a housing cap positioned at the first end of the housing, and wherein the housing cap includes a one-way valve allowing for a flow of fluid from the unfiltered water chamber to the reservoir.

15. The beverage dispenser of claim 14, further comprising a pump in flow communication with the reservoir and the hot water chamber, the pump configured to provide a flow of the water from the reservoir to the hot water chamber when activated;
a priming vent in flow communication with the pump and the reservoir for providing the flow of the water from the pump to the reservoir during a priming operation of the pump; and
a one-way valve positioned in the priming vent for preventing a flow of fluid in a direction from the reservoir through the priming vent towards the pump.

16. The beverage dispenser of claim 14, wherein the water filter assembly further comprises
a second filter cap, wherein the filter medium extends between a first end and a second end, wherein the second filter cap is positioned at the second end of the filter medium and defines a cylindrical sleeve extending away from the filter medium along the axial direction, wherein the housing also defines a cylindrical sleeve extending away from the filter medium along the axial direction, wherein the cylindrical sleeve of the second filter cap is positioned inward along the radial direction from the cylindrical sleeve of the housing such that the cylindrical sleeve of the second filter cap and the cylindrical sleeve of the housing together define a slot, and wherein fitting of the reservoir is received in the slot.

17. The beverage dispenser of claim 16, wherein the cylindrical sleeve of the second filter cap includes a seal extending around an outer surface of the cylindrical sleeve, the seal configured to contact the an inner surface of the fitting of the reservoir, and wherein the fitting includes a seal extending around an outer surface of the fitting configured to contact an inner surface of the cylindrical sleeve of the housing.

18. The beverage dispenser of claim 14, wherein the water filter assembly further comprises
a stability adaptor defining a cylindrical shape, wherein the stability adaptor contacts an outer surface of the housing at the second end of the housing, wherein the stability adapter at least partially surrounds the second end of the housing and is removably attached to the second end of the housing, and wherein the stability adaptor extends past the second end of the housing along the axial direction for contacting the fitting surrounding the outlet of the reservoir.

19. The beverage dispenser of claim 14, further comprising
an attachment adaptor defining a cylindrical shape, wherein the attachment adaptor is removably attached to an outer surface of the housing at the second end of the housing and at least partially surrounds the second end of the housing, wherein the attachment adaptor includes a connection portion extending past the second end of the housing along the axial direction for connection to a fitting surrounding the outlet of the reservoir.

20. The beverage dispenser of claim 19, wherein the connection portion of the attachment adaptor defines an axial end, and wherein the axial end includes a seal configured to form a seal with one or both of the reservoir and the fitting surrounding the outlet of the reservoir when the water filter assembly is attached to the fitting using the attachment adaptor.

* * * * *